US005889134A

United States Patent [19]
Pu et al.

[11] Patent Number: 5,889,134
[45] Date of Patent: Mar. 30, 1999

[54] CHIRAL ORGANOZINC SPECIES FOR USE IN ASYMMETRIC REACTIONS

[75] Inventors: Lin Pu; Wei-Sheng Huang; Qiao-Sheng Hu, all of Fargo, N. Dak.

[73] Assignee: North Dakota State University, Fargo, N. Dak.

[21] Appl. No.: 918,309

[22] Filed: Aug. 26, 1997

Related U.S. Application Data

[63] Continuation-in-part of Ser. No. 756,748, Nov. 26, 1996, abandoned.

[51] Int. Cl.$^6$ .................................................... C08G 16/00
[52] U.S. Cl. ......................... 528/86; 528/97; 528/125; 528/127; 528/138; 528/225; 528/230; 528/234; 528/480; 528/495; 528/503
[58] Field of Search ............................. 528/86, 230, 234, 528/480, 495, 503, 125, 127, 138, 97, 225

[56] References Cited

PUBLICATIONS

Abstract from Fargo Conference on Main Group Chemistry, Fargo, N.D. (May 30 – Jun.1, 1996).
Anderson, et al., "A New Family of Chiral Binaphthyl–Derived Cyclophane Receptors: Complexation of Pyranosides", *Angew. Chem. Int. Ed. Eng.*, 34(15): 1596–1600 (1995).
Bedworth, et al., "Synthesis of A Chiral Nonracemic Segmented Screwlike Oligomer. An Unusual Form of Molecular Chirality", *Macromolecules*, 27(2): 622–624 (1994).
Belohradsky, et al., "Reaction of 1,4–Dibromo–2,3–dihydroxynaphthalene with 2–Naphthoxide Ion. Solvent and Cation Control in the Formation of the Conformationally Locked Stereoisomers of 2,2',3',2"–Tetrahydroxy–1, 1':4'1"–ternaphthyl and 2,2',3',2",3",2"'–Hexahydroxy–1, 1':4",1":4",1"'–quaternaphthyl", *J. Org. Chem.*, 61(4): 1205–1210 (1996).
Bernardo, K. et al., "Synthesis and Characterization of New Chiral Schiff Base Complexes with Diiminobinaphthyl or Diiminocyclohexyl Moieties as Potential Enantioselective Epoxidation Catalysts", *Inorganic Chemistry*, 35(2): 387–396 (1996).
Bhowmik, et al., "Fully Aromatic Liquid Crystalline Homopolyesters and Copolyesters of 1,1'–Binaphthyl–4, 4'–Diol", *J. Polym. Sci. Part A: Polym. Chem.*, 32: 651–659 (1994).
Brown, K. et al., "Synthesis of Optically Active 2,2'–Dihalo–1,1'–binaphthyls via Stable Diazonium Salts", *J. Org. Chem.*, 50: 4345–4349 (1985).
Cheng, H. et al., "The First Sterically Regular Chiral Conjugated Crown Ether Polymer", *Tetrahedron: Asymmetry*, 7(11): 3083–3086 (Nov. 1996).
Chow, et al., "Synthesis, Chiroptical and Redox Properties of Axially Chiral Binaphthol–based Oligomers", *Tetrahedron: Asymmetry*, 7(8): 2251–2262 (1996).
Cox, et al., "Expedient Route to 3– and 3,3'–Substituted 1,1'–Bi–2–Naphthols by Directed ortho Metalation and Suzuki Cross Coupling Methods", *Tetrahedron Letters*, 33(17): 2253–2256 (1992).

Deloux, L. et al., "Asymmetric Boron–Catalyzed Reactions", *Chem. Rev.*, 93: 763–784 (1993).
Enders, D. et al., "Asymmetric Epoxidation of Enones With Oxygen in the Presence of Diethylzinc and (R,R)–N–Methylpseudoepherdine", *Angew. Chem. Int. Ed. Eng.*, 35(15): 1725–1728 (1996).
Falborg, L. et al., "Asymmetric Titanium–Catalysed Michael Addition of O–benzylhydroxylamine to α,β–unsaturated Carbonyl Compounds: Synthesis of β–amino acid precursors", *J. Chem.Soc., Perkin Trans.*, 1: 2823–2826 (1996).
Han, et al., "Wholly Aromatic Thermotropic Liquid Crystalline Polyesters of 4,4'–Biphenol, Substituted Biphenols, and 1,1'–Binaphthyl–4,4'–diol with 3,4'–Benzophenone Dicarboxylic Acid", *J. Polym. Sci. Part A: Polym. Chem.*, 33: 211–225 (1995).
Hu, Q. et al., "Conjugated Polymers with Main Chain Chirality. 1. Synthesis of an Optically Active Poly(arylenevinylene)", *Macromolecules*, 29: 1082–1084 (Jan. 29, 1996).
Hu, Q. et al., "Conjugated Polymers with Main Chain Chirality. 2. Synthesis of Optically Active Polyarylenes", *Macromolecules*, 29: 5075–5082 (Jul. 15, 1996).
Hu, Q. et al., "Poly (1,1'–bi–2–naphthol)s: Synthesis, Characterization, and Application in Lewis Acid Catalysis", *J. Org. Chem*, 61(24): 8370–8377 (Nov. 29, 1996).
Hu, Q. et al., "The First Optically Active and Sterically Regular Poly (1,1'–bi–2–naphthol)s: Precursors to a New Generation of Polymeric Catalysts", *The Journal of Organic Chemistry*, vol. 61(16): 5200–5201 (Aug. 9, 1996).
Hu, Q. et al., "An Efficient and Practical Direct Resolution of Racemic 1,1'–Bi–2–naphthol to Both of Its Pure Enantiomers", *Tetrahedron: Asymmetry*, 6(9): 2123–2126 (1995).
Hu, Q. et al., "Synthesis of A 1,1'–Binaphthyl Based Main Chain Chiral Conjugated Polymer", *Mat. Res. Soc. Symp. Proc.*, 413: 621–626 (1996).
Huang, W. et al., "Development of Highly Enantioselective Polymeric Catalysts Using Rigid and Sterically Regular Chiral Polybinaphthols", *J. Am. Chem. Soc.*, 119: 4313–4314 (May 7, 1997).
Huber, et al., "A Soluble Poly(para–phenylene) Composed of Cyclophane Units: Poly[2,5–(oxydecanoxy)–1,4–phenylene]", *Macromol. Rapid Commun.*, 15: 897–902 (1994).

(List continued on next page.)

*Primary Examiner*—Duc Truong
*Attorney, Agent, or Firm*—Merchant & Gould, P.A.

[57] ABSTRACT

An organozinc species, useful in the reactions of aldehydes and ketones, is a reaction product of a) a biphenyl compound having one or more hindered 2,2'-substituted biphenyl subunits and b) an organozinc compound, such as diethylzinc. The organozinc species catalyzes the reduction of a ketone by a borane, as well as the epoxidation of α,β-unsaturated compounds by an oxidizing agent, such as $O_2$ or an alkyl hydroperoxide. The biphenyl compound may be chiral and may catalyze the formation of optically active reaction products.

18 Claims, No Drawings

OTHER PUBLICATIONS

Itsuno, S. et al., "New Solid–Phase Catalysts for Asymmetric Synthesis: Cross–Linked Polymers Containing a Chiral Shiff Base–Zinc Complex", *J. Org. Chem.*, 55(1): 304–310 (1990).

Itsuno, S. et al., "Polymer–Supported Poly(amino acids) as New Asymmetric Epoxidation Catalyst of α,β–Unsaturated Ketones", *J. Org. Chem.*, 55: 6047–6049 (1990).

Kitajima, H. et al., "Enantioselective Addition of Diethylzinc to Aldehydes Using 1,1'–Bi–2–naphthol–3,3'–dicarboxamide as a Chiral Auxiliary", *Chemistry Letters:* 343–344 (1996).

Kitajima, H. et al., N,N,N',N',–Tetraalkyl–2,2–dihydroxy–1,1'–binaphthyl–3,3'–dicarboxamides: Novel Chiral Auxiliaries for Asymmetric Simmons–Smith Cyclopropanation of Allylic Alcohols and for Asymmetric Diethylzinc Addition to Aldehydes 11: *Bull. Chem. Soc. Jpn.*, 70: 207–217 (1997).

Kawakami, Y. et al., "An Asymmetric Synthesis of 2,4–Dimethylvalerolactone and Mevalonolactone using Chiral Binaphthyldiamine Derivatives", *J. Chem. Soc., Chem. Commun:* 779–781 (1984).

Kroutil, W. et al., "Unexpected Asymmetric Epoxidation Reactions Catalysed by Polyleucine–Based Systems", *Chem. Commun.:* 845–846 (1996).

Liou, et al., "Preparation and Properties of Aromatic Polyimides from 2,2'–Bis(p–aminophenoxy)biphenyl or 2,2'–Bis(p–aminophenoxy)–1,1'–binaphthyl and Aromatic Tetracarboxylic Dianhydrides", *J. Polym. Sci. Part A: Polym. Chem.*, 31: 3273–3279 (1993).

Ma, L. et al., "A New Class of Chiral Conjugated Polymers with a Propeller–Like Structure", *Macromolecules*, 30(2): 204–218 (Jan. 27, 1997).

Ma, L. et al., "Chiral Conjugated Propeller Polymers", *Polymer Preprints*, 37(2): 462–463 (Aug. 1996).

Ma, L. et al., "Conjugated Polymers with Main Chain Chirality. 3. Synthesis of Optically Active Poly(aryleneethynylene)s", *Macromolecules*, 29(15): 5083–5090 (Jul. 15, 1996).

Ma, L. et al., "Synthesis of an Optically Active Poly(aryleneethynylene) Containing Extended Conjugation in the Repeat Unit" *Tetrahedron: Asymmetry*, 7(11):3103–3106 (Nov. 1996).

Mi, et al., "Optically Active Aromatic Polyimides Having Axially Dissymmetric 1,1'–Binaphthalene–2,2'–diyl Units", *Macromolecules*, 29(17): 5758–5759 (1996).

Mislow, K. et al., "Absolute Configuration of 1,1'–Bi–2–naphthylamine", *J. Org. Chem.*, 23: 2027–2028 (Dec. 1958).

Miyano, S. et al., "Axially Dissymmetric Bis(aminophosphine)s Derived from 2,2'–Diamino–1,1'–binaphthyl. Synthesis and Application to Rhodium(I)–Catalyzed Asymmetric Hydrogenations", *Bull. Chem. Soc. Jpn*, 57: 2171–2176 (1984).

Miyaura, et al., "The Palladium–Catalyzed Cross–Coupling Reaction of Phenylboronic Acid with Haloarenes in the Presence of Bases", *Synthetic Communications*, 11(7): 513–519 (1981).

Nakano, et al., "Toward Control of Stereochemistry in GTP by a Rational Monomer Design. Cyclopolymerization of 2,2'–Bis((methacryloyloxy)methyl)–1,1'–binaphthyl", *J. Am. Chem. Soc.*, 117(1): 534–535 (1995).

Neidlein, et al., "Selective Complexation of Disaccharides by a Novel $D_2$–symmetrical Receptor in Protic Solvent Mixtures", *Chem. Commun.:* 1493–1494 (1996).

Noyori, et al., "Enantioselective Addition of Organometallic Reagents to Carbonyl Compounds: Chirality Transfer, Multiplication, and Amplification", *Angew. Chem. Int. Ed. Engl.*, 30: 49–69 (1991).

Noyori, et al., "Enantioselective Alkylation of Carbonyl Compounds. From Stoichiometric To Catalytic Asymmetric Induction", *Pure & Appl. Chem.*, 60(11): 1597–1606 (1988).

O'Connor, M. et al., "Diastereoisomeric Four–Coordinate Complexes. V. Pseudo–Tetrahedral Complexes of Controlled Absolute Configuration. Configurational Interconversion of Nickel (II) Complexes without Racemization", *Journal of American Chemical Society:* 90(17): 4561–4568 (Aug. 14, 1968).

Percec, et al., "Soluble Polyarylenes Containing Alternating Binaphthylene and Biphenylene Structural Units", *J. Polym. Sci. Part A: Polym. Chem.*, 30: 1037–1049 (1992).

Percec, et al., "Synthesis and Ni(O)–Catalyzed Polymerization of 2,5–Bis(4–chloro–1–naphthyl)biphenyl", *J. Polym. Sci. Part A: Polym. Chem.*, 31: 1087–1091 (1993).

Peruci, P. et al., "Synthesis, Chirooptical Properties and Catalytic Activity _–Rhodium (I) and –iridium (I) Cationic Complexes Containing Binaphthyl, $C_2$–symmetric Diamine Ligands", *J. Org. Chem.*, 515: 163–171 (1996).

Pradellok, et al., "Bis(6–bromo–2–hydroxy–1–naphthyl)", *Chem. Abstr.*, Abstract 90: 121289t (1979).

Prasad, et al., "$C_2$–Symmetric Chiral Zinc Alkoxides as Catalysts for the Enantioselective Addition of Diethylzinc to Aryl Aldehydes", *Tetrahedron: Asymmet*, 7(7): 1957–1960 (1996).

Pu, L., "The AsymmetricReaction of Aldehydes with Dialkylzincs Catalyzed by Polybinaphthols", Worldwide Conference, Chira Tech '97, Philadelphia, Pennsylvania: 11 pages (Nov. 11–13, 1997).

Pu, L., "The Study of Chiral Conjugated Polymers", *Acta Polymer*, 48: 116–141 (Apr. 1997).

Puts, et al., "The First Report of Cyclopolymerization of Bis(oxazolines) To Give Optically Active Polymacrocycles", *Macromolecules*, 28: 390–392 (1995).

Qian, et al., "Chiral Molecular Recognition in Polymer Langmuir–Blodgett Films Containing Axially Chiral Binaphthyl Groups", *J. Am. Chem. Soc.*, 115(13): 5624–5628 (1993).

Sakane, S., et al., "Asymmetric Cyclization of Unsaturated Aldehydes Catalyzed by a Chiral Lewis Acid", *Tetrahedron Letters*, 26(45): 5535–5538 (1985).

Sanchez, M. et al., "Enantiocomplementary Asymmetric Epoxidation of Selected Enones using Poly–L–leucine and Poly–D–leucine", *J. Chem. Soc. Perkin Trans:* 1467–1468 (1995).

Seebach, et al., "146. Polymer– and Dendrimer–Bound Ti–TADDOLates in Catalytic (and Stoichiometric) Enantioselective Reactions: Are Pentacoordinate Cationic Ti Complexes the Catalytically Active Species?", *Helvetica Chimica Acta*, 79: 1710–1740 (1996).

Sepulchre, M. et al., "The Use of Atropoisomeric Chiral Initiators in the Polymerization of Heterocyclic Monomers: An Example of Almost Ideal Stereoelection in the Case of Methylthiirane", *Makromol. Chem., Rapid Commun.*, 2: 261–266 (1981).

Singh, V., "Practical and Useful Methods for the Enantioselective Reduction of Unsymmetrical Ketones", *Synthesis:* 605–617 (Jul. 1992).

Slides presented at Gordon Research Conference, New England College, Henniker, New Hampshire (Jun. 25–30, 1995).

Slides presented at Materials Research Society, 1995 Fall meeting, Boston, Mass. (Nov. 27–Dec. 1, 1995).

Smrcina, M. et al., "Synthesis of Enantiomerically Pure 2,2'–Dihydroxy–1,1'–binapthyl, 2,2'–Diamino–1,1'–binaphthyl, and 2–Amino–2'–hydroxy–1,1'–binaphthyl. Comparison of Processes Operating as Diastereoselective Crystallization and as Second–Order Asymmetric Transformation", *J. Org. Chem.,* 57: 1917–1919 (1992).

Soai, et al., "Enantioselective Addition of Organozinc Reagents to Aldehydes", *Chem. Rev.,* 92(5): 833–856 (1992).

Sogah, et al., "Host–Guest Complexation. 14. Host Covalently Bound to Polystyrene Resin for Chromatographic Resolution of Enantiomers of Amino Acid and Ester Salts[1,2]", *J. Amer. Chem. Soc.,* 101(11): 3035–3042 (May 231979).

Suzuki, "Organoborates in New Synthetic Reactions", *Acc. Chem. Res.,* 15: 178–184 (1982).

Tamai, et al., "Synthesis of Optically Active Polyamides Having Axially Dissymmetric 1,1'–Binaphthalene–2,2'–dicarboxylic Acid Component and Their Optical Resolution Ability as Chiral Adsorbent for HPLC", *Bull. Chem. Soc. Jpn.,* 64(7): 2260–2265 (1991).

Vitharana, et al., "An Optically Active Polybinaphthyl. Nickel(O)–Mediated Polymerization of 6,6'–Dibromo–2, 2'–dihexyloxy–1,1'–binaphthyl", *Polymer Preprints,* 37: 855–856 (1996).

Wallow, et al., "In Aqua Synthesis of Water–Soluble Poly(p–phenylene) Derivatives", In Communications to the Editor, *J. Am. Chem. Soc.,* 113: 7411–7412 (1991).

Widhalm, M. et al., "Macrocyclic Diphosphine Ligands in Asymmetric Carbon—Carbon Bond–Forming Reactions", *J. Organometallic Chem.,* 523: 167–178 (1996).

CHIRAL ORGANOZINC SPECIES FOR USE IN ASYMMETRIC REACTIONS

This is a continuation-in-part of U.S. patent application Ser. No. 08/756,748, filed Nov. 26, 1996 herein incorporated by reference now abandoned.

BACKGROUND OF THE INVENTION

Catalysts are an important component of many chemical reactions as they typically increase the rate of the reaction. They may also inhibit the formation of competing products as there is less time for significant product formation by competing reactions. Beyond improving reaction rate and enhancing product yield, catalysts may also provide an enantioselective mechanism for obtaining an optically active product. Often an enantioselective catalyst is itself chiral and optically active. There is a need for the development of enantioselective catalysts to catalyze reactions resulting in optically active products. Many naturally occurring and biologically active molecules are optically active and many reaction mechanisms, especially biological reactions, only function with compounds having a specific enantiomeric configuration.

Polymeric catalysts may be useful in large-scale industrial applications. It is often easy to separate the polymeric catalyst from the products of the catalyzed reaction as a polymeric catalyst has special solubility properties because of its macromolecular nature. In addition, removal of the polymeric catalyst by filtration is typically enhanced because of the polymer's large size. Furthermore, studies have also shown that polymer-supported catalysts may have more durable catalytic activity than monomeric metal complexes. It is, however, often difficult to predict the activity of a polymeric catalysts from knowledge about the monomer.

A number of catalysts are organometallic species, which are formed by the combination of an organic molecule or polymer and a metallic compound, cation, or complex. Organozinc species are known catalysts in the alkylation of aldehydes, see reviews by Soai, et al., *Chem. Rev.*, 92, 833 (1992) and Noyori, et al., *Angew. Chem. Int. Ed. Engl.*, 30, 49 (1991) and the reduction of ketones, see review by Deloux, et al., *Chem. Rev.*, 93, 763 (1993). Both monomeric and polymeric catalysts are known. However, the polymeric catalysts that have been studied are primarily known chiral catalysts of the reaction which are covalently bonded to an achiral polymeric backbone, such as polyethylene or polystyrene. See e.g., Soai, et al., *Chem. Rev.*, 92, 833 (1992) and D. Seebach, *Helvetica Chimica Acta*, 79, 1710 (1996). A polymeric chiral catalyst with a backbone structure that is sterically regular could potentially provide better enantioselectivity or catalytic activity than chiral molecules merely attached as pendent groups on a polymer backbone.

Because of the enhanced reaction rate and decreased formation of side products, and, in the case of chiral catalysts, potential enhanced enantioselectivity, there is a need for the development of new catalysts which may provide improved reaction times, yields, or enantioselectivity to the reactions. Furthermore, there is a need for new catalysts which may be useful with a variety of substrates.

SUMMARY OF THE INVENTION

The present invention is directed to organozinc species, formed from reaction of an organozinc compound with a biphenyl compound, and their use in enantioselective reactions. One embodiment is an organozinc species which includes the reaction product of a) a biphenyl compound having at least one hindered 2,2'-substituted biphenyl subunit and (b) an organozinc compound, such as diethyl zinc. The biphenyl compound has the formula:

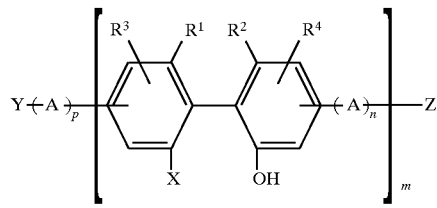

where n is 0 or 1; p is 0 or 1; A is a rigid subunit; and m is an integer greater than 3. Y and Z are end groups and may be independently H, Cl, Br, I, $B(OH)_2$, or substituted or unsubstituted aryl or aralkyl groups. X is $—OR^{18}$, $—NR^{19}R^{20}$, or $—SR^{21}$ where $R^{18}$, $R^{19}$, $R^{20}$, and $R^{21}$ are independently hydrogen, alkyl, cycloalkyl, aryl, or aralkyl. $R^1$ and $R^2$ are hindering groups where $R^1$, $R^2$ or a combination thereof provides sufficient hindrance to internal rotation such that the biphenyl subunits have an enantiomeric interconversion rate of no more than about 1% per hour at 100° C. $R^3$ and $R^4$ are independently hydrogen, alkyl, alkoxy, alkynyl, aryl, aralkyl, vinyl, trialkylsilyl, triarylsilyl, $—CONR^5R^6$, $—CO_2R^7$, $—SO_2R^8$, $—NR^9R^{10}$, or halogen, where $R^5$, $R^6$, $R^7$, $R^8$, $R^9$ and $R^{10}$ are independently alkyl, aralkyl or aryl. Alternatively, $R^1$ and $R^3$ form a substituted or unsubstituted first fused ring and/or $R^2$ and $R^4$ form a substituted or unsubstituted second fused ring. The organozinc compound is generally $R^{14}R^{15}Zn$, where $R^{14}$ and $R^{15}$ are independently substituted or unsubstituted alkyl, alkenyl, alkynyl, aryl, aralkyl, or benzoyl groups. Alternatively, $R^{14}$ may be a trialkylsilyl- or triarylsilyl-substituted alkyl group.

Another embodiment is a method of reducing a ketone which includes reacting the ketone with a borane in the presence of the organozinc species, described above, where m is greater than 0 (i.e., the biphenyl compound can be a monomer or a polymer).

Another embodiment of the invention is directed to a method of epoxidation of an α,β-unsaturated compound having the following formula:

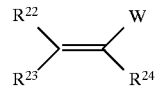

where W is $—CN$, $—NO_2$, $—C(O)H$, $—C(O)R^{25}$, $—C(O)OR^{26}$, or $—C(O)NR^{27}R^{28}$ and $R^{22}$, $R^{23}$, $R^{24}$, $R^{25}$, $R^{26}$, $R^{27}$, and $R^{28}$ are independently hydrogen, alkyl, aryl, aralkyl, trialkylsilyl, or triarylsilyl. The method includes reacting the α,β-unsaturated compound with an oxidizing agent in the presence of the organozinc species described above, where m is greater than 0 (i.e., the biphenyl compound can be a monomer or a polymer).

DETAILED DESCRIPTION OF THE INVENTION

A biphenyl compound of the present invention can be used to form an organozinc species by reaction with an organozinc compound. This organozinc species can be used as a catalyst/reagent in a number of different reactions, including the alkylation of an aldehyde to form a secondary alcohol; the reduction of a ketone to form a secondary alcohol; and the epoxidation of an α,β-unsaturated compound having the following formula:

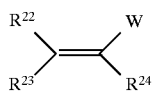

where W is —CN, —NO$_2$, —C(O)H, —C(O)R$^{25}$, —C(O)OR$^{26}$, or —C(O)NR$^{27}$R$^{28}$ and R$^{22}$, R$^{23}$, R$^{24}$, R$^{25}$, R$^{26}$, R$^{27}$, and R$^{28}$ are independently hydrogen, alkyl, aryl, aralkyl, trialkylsilyl, or triarylsilyl. An optically active biphenyl compound may be used to generate an optically active organozinc species which may catalyze the above mentioned reactions to form optically active products. A preferred organozinc species for these reactions includes the reaction product of an organozinc compound with a biphenyl compound having one or more hindered 2,2'-substituted biphenyl subunits.

STRUCTURE AND FORMATION OF THE BIPHENYL COMPOUNDS

A preferred biphenyl compound has the formula 1.

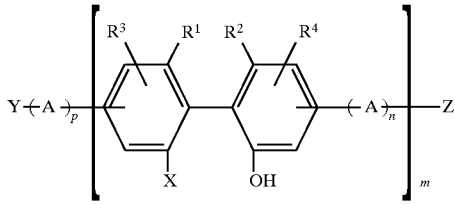

The biphenyl compound may be a monomer (m=1) or a polymer (m>1). The polymeric biphenyl compound typically includes at least 4 and no more than about 200 2,2'-substituted biphenyl subunits. Preferably, the polymeric biphenyl compound has about 5 to about 50 biphenyl subunits.

In the polymeric version of the biphenyl compound, the 2,2'-substituted biphenyl subunits may be coupled directly together (i.e., n=0) or may be linked by a rigid subunit, A (i.e., n=1), which, in the polymeric biphenyl compounds, acts as a spacer between 2,2'-substituted biphenyl subunits. Y and Z are end groups and may be independently H, Cl, Br, I, B(OH)$_2$, or substituted or unsubstituted aryl or aralkyl groups and p can be 0 or 1. X is —OR$^{18}$, —NR$^{19}$R$^{20}$, or —SR$^{21}$ where R$^{18}$, R$^{19}$, R$^{20}$, and R$^{21}$ are independently hydrogen, alkyl, cycloalkyl, aryl, or aralkyl.

R$^3$ and R$^4$ are substituents attached to the phenyl rings of the 2,2'-substituted biphenyl subunit and are functional groups that do not substantially compete with the phenolic hydroxy groups at the 2 and/or 2' positions for the complexation of the zinc cation of the organozinc compound. For example, R$^3$ and R$^4$ can independently be hydrogen, alkyl, alkoxy, alkynyl, aryl, aralkyl, vinyl, trialkylsilyl, triarylsilyl, halogen, —CONR$^5$R$^6$, —CO$_2$R$^7$, —SO$_2$R$^8$, or —NR$^9$R$^{10}$ where R$^5$, R$^6$, R$^7$, R$^8$, R$^9$ and R$^{10}$ are independently alkyl, aralkyl or aryl.

Alternatively, R$^1$ and R$^3$ and/or R$^2$ and R$^4$ can form a fused ring with the phenyl group to which they are attached. The fused ring may optionally be substituted with one or more substituents. Suitable substituents include alkyl, alkoxy, aryl, aralkyl, —CONR$^5$R$^6$, —CO$_2$R$^7$, —SO$_2$R$^8$, alkynyl, vinyl, trialkylsilyl, triarylsilyl, halogen or —NR$^9$R$^{10}$ where R$^5$, R$^6$, R$^7$, R$^8$, R$^9$, and R$^{10}$ are independently substituted or unsubstituted alkyl, aralkyl or aryl.

Typically, alkyl, alkenyl, alkynyl, and alkoxy groups are C(1–20) groups and aryl and aralkyl are C(4–50), and preferably C(6–18), groups unless otherwise indicated. A 'substituted' functional group (e.g., alkyl, aryl, aralkyl, alkenyl, or alkynyl groups) may include substituents such as halogen, alkoxy, trialkylsilyl, triarylsilyl, —NRR', —CO$_2$R, and —CONRR' where each R and R' group is independently alkyl, aryl, or aralkyl. Unless otherwise noted, the term 'alkyl' includes both alkyl and cycloalkyl groups. In addition, unless otherwise noted, the term 'alkoxy' includes both alkoxy and cycloalkoxy groups.

R$^1$ and R$^2$ are hindering groups which make the 2,2'-substituted biphenyl subunits chiral. The chirality of the 2,2'-substituted biphenyl subunits results from the hindered internal rotation of the two phenyl rings. Internal rotation refers to the relative rotation of two portions of a molecule with respect to each other about an axis which corresponds to a chemical bond between the two portions. In the case of the 2,2'-substituted biphenyl subunit, the internal rotation of interest is the relative rotation of the phenyl rings with respect to each other around an axis corresponding to the bond between the two phenyl rings (i.e., the 1,1' bond).

The potential energy due to steric interactions between two portions of a molecule that are rotating with respect to each other is a function of the relative angle between the two portions. This interaction energy is the sum of the Van der Waals and electrostatic interactions between atoms of one rotating portion and atoms of the other portion. The Van der Waals interactions are always repulsive but the electrostatic interactions may be either attractive or repulsive. Generally, the strength of these interactions is dependent on the distance between the atoms. In typical molecules, as the rotating portions get closer together, the interaction energy increases.

In the case of the 2,2'-substituted biphenyl subunit, when the two phenyl rings, both of which are essentially planar structures, achieve an approximately coplanar configuration the interaction energy between the two phenyl rings reaches a maximum because the atoms of the two phenyl rings are, overall, closer to each other than in any other configuration. On the other hand, when the two phenyl rings are at approximately right angles to each other, the interaction energy is at a minimum as the groups are further apart than at any other time during a rotation. A full 360° rotation has two maxima, corresponding to the two approximately coplanar configurations, and two minima, corresponding to the two approximately orthogonal configurations.

The difference between the maximum and minimum energies (or more correctly the difference between the molecular energy levels closest to the maximum and minimum energies) is the activation energy required by the molecule for internal rotation. There will be relatively free rotation about the internal rotation axis when the activation energy is small compared to kT, where k is Boltzmann's constant and T is the temperature in Kelvin. When the activation energy is near kT, some of the molecules will have energy to overcome the activation barrier and will rotate, the rest will be hindered from rotation until they receive more energy from sources such as thermal heating. The number of molecules at any given point in time having sufficient energy to overcome the activation barrier is determined from Maxwell-Boltzmann statistics. When the activation energy is much greater than kT the molecules will not have sufficient energy to rotate and will therefore be effectively hindered.

The phenyl rings of unsubstituted biphenyl freely rotate at room temperature. However, the addition of hindering groups on one or more of the phenyl rings can increase the activation energy for internal rotation and significantly hinder internal rotation about the 1,1' bond at room temperature. The $R^1$ and $R^2$ substituents are chosen to hinder the internal rotation of the 2,2'-substituted biphenyl subunits. Functional groups as small as methyl groups can hinder the internal rotation of the biphenyl subunit.

When the biphenyl compound is reacted with an organozinc compound to form an organozinc species, the phenolic (i.e., 2 and/or 2') hydroxy groups combine with the zinc compound to form an active catalytic site. Although other molecules of the zinc compound may bind or complex with the hindering groups, other substituents on the biphenyl rings, substituents on the rigid subunits, or functional groups in other parts of the biphenyl compound, these combinations should typically be less active towards reactants in the reaction to be catalyzed (e.g., the alkylation of an aldehyde).

Examples of suitable $R^1$ and $R^2$ groups include alkyl, alkoxy, aryl, aralkyl, —$CONR^5R^6$, —$CO_2R^7$, —$SO_2R^8$, alkynyl, vinyl, —$NR^9R^{10}$, trialkylsilyl, or triarylsilyl where $R^5$, $R^6$, $R^7$, $R^8$, $R^9$ and $R^{10}$ are independently alkyl, aralkyl, or aryl. Alternatively, as mentioned above, $R^1$ and $R^3$ and or $R^2$ and $R^4$, in combination with the phenyl ring to which they are attached, may form a substituted or unsubstituted fused ring. One example of a biphenyl compound with a fused ring structure is a binaphthyl compound 2 having 2,2'-substituted 1,1'-binaphthyl subunits and the formula:

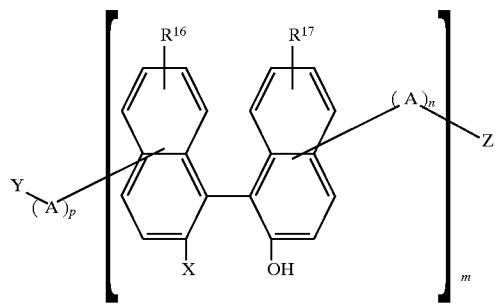

where $R^{16}$ and $R^{17}$ are independently alkyl, alkoxy, aryl, aralkyl, —$CONR^5R^6$, —$CO_2R^7$, —$SO_2R^8$, alkynyl, vinyl, trialkylsilyl, triarylsilyl, halogen, or —$NR^9R^{10}$, where $R^5$, $R^6$, $R^7$, $R^8$, $R^9$, and $R^{10}$ are independently alkyl, aralkyl, or aryl.

Binaphthyl compounds having formulas 3 and 4 illustrate specific examples of the biphenyl compounds of this invention. Optically active binaphthyl compounds 3 and 4 have shown enantioselective catalytic activity as demonstrated in the Examples, hereinbelow.

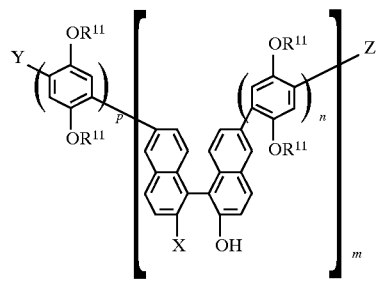

The $R^{11}$ group in the aromatic ether functionality of polymers 3 and 4 is typically hydrogen or a C(1–20) alkyl or cycloalkyl, and is preferably C(3–8) alkyl.

Hindering groups may also be placed at positions on the phenyl ring meta to the 1,1' bond. Such groups, however, must be substantially larger than a methyl group to ensure adequate steric hindrance because they are positioned further away from the other phenyl ring.

A hindered 2,2'-substituted biphenyl subunit is usually chiral. The two configurations of the hindered 2,2'-substituted biphenyl subunits associated with the two potential energy minima are enantiomers. Hindered molecules with an activation energy much greater than kT are considered chiral because they remain in one enantiomeric configuration. In contrast, unhindered (i.e., freely rotating) molecules should not be considered chiral as there will be rapid interconversion from one enantiomeric configuration to the other. Less rapid interconversion will occur when the activation energy of the internal rotation is near kT because only a portion of the molecules will have energy to rotate between the enantiomeric configurations. Although these molecules are chiral, an initially optically active sample will show a decrease in optical activity over time as molecules within the sample interconvert to the other enantiomer. This interconversion process leads to the racemization of the compound.

One measure of the hindering effect of $R^1$ and $R^2$ is the amount of optical activity lost over time. For the purposes of this application, the enantiomeric interconversion rate is defined as the percentage loss of optical activity per hour at a specific temperature. The enantiomeric interconversion rate of an optically active biphenyl compound is especially important when the desired product is optically active. An optically active product typically can not be synthesized in high yields and with high enantiomeric excess if there is significant racemization of the biphenyl subunits during the reaction as there will be fewer biphenyl subunits having the correct enantiomeric configuration for production of the optically active product. Thus, the most useful biphenyl compounds will have interconversion rates which have little loss in optical activity over the duration of the reaction to be catalyzed. The biphenyl compounds of the invention typically have an enantiomeric interconversion rate of less than about 1% per hour at 50° C. Preferably, the biphenyl compounds have an enantiomeric interconversion rate of less than about 1% per hour at 100° C.

A biphenyl compound with a majority of the hindered 2,2'-substituted biphenyl subunits having the same enantiomeric configuration is optically active. These optically active compounds may be useful in producing optically active products by mechanisms such as asymmetric induction. The biphenyl compound may have an enantiospecific structure which limits the geometry of the reactants, in the presence of an organozinc species made from the biphenyl compound, so that predominantly one enantiomer of the product is obtained. The enantiospecific structure of the biphenyl compound may result from, for example, steric hindrance of other possible reaction geometries by portions of the biphenyl compound (e.g., the rigid subunit, A, and/or substituents on the phenyl rings of the 2,2'-substituted biphenyl subunits). In some embodiments, a quantity of a biphenyl compound is optically active and has at least about 10% of the 2,2'-substituted biphenyl subunits, preferably at least about 50%, more preferably at least about 75%, and most preferably at least about 95% of the 2,2'-substituted biphenyl subunits with the same enantiomeric configuration.

Another important part of the biphenyl compound is the phenolic hydroxy group(s) at the 2 and/or 2' positions. The hydroxy group(s) provide a site for binding, either covalently or coordinatively, with metal cations or complexes. Although no particular theory is necessary to the invention, it is believed that the hydroxy group(s) of the biphenyl compound complex with the organozinc compound to form the organozinc species. It is thought that this provides a catalytically active site. Other substituents of the biphenyl compound may coordinatively complex with an organozinc compound which is also complexed with one or both of the phenolic (i.e., 2,2') hydroxy group(s). For example, the ether oxygens on the rigid subunits, A, of binaphthyl compound 4 may provide sites for complexation with a metal cation such as zinc that is also complexed with one or more naphtholic hydroxy groups. Such coordinative complexation may provide a geometry which enhances an enantioselective catalytic-activity of the biphenyl compound.

A preferred biphenyl compound with ether oxygens on the rigid subunit for the complexation with a metal cation or atom complexed with one or more of the groups at the 2 and/or 2' positions has formula 5:

cyclic groups or combinations thereof, $R^{11}$ is hydrogen or a C(1–20) alkyl or cycloalkyl, and $R^{12}$ and $R^{13}$ are independently hydrogen, halogen, C(1–20) alkyl or cycloalkyl, C(1–20) alkoxy or cycloalkoxy, trialkylsilyl, or triarylsilyl. Preferably, X is OH, $R^{11}$ is C(3–8) alkyl and B is a substituted or unsubstituted phenyl, heterocycle, or alkynyl group. Compound 5 may be a monomer (m=1) or a polymer (m>1).

The binaphthyl compound 6 is an illustration of a preferred compound for formation of the organozinc species.

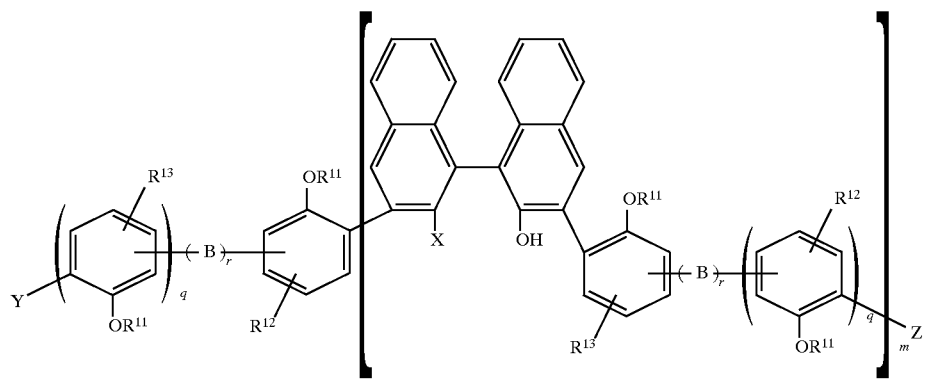

6

The biphenyl compound may include a rigid subunit, A and/or B. The rigid subunit may provide a needed geometry to hinder the formation of side products or undesired enantiomers through steric hindrance of unwanted reaction geometries. In polymeric biphenyl compounds, the rigid subunit may separate the 2,2'-substituted biphenyl subunits. The rigid subunit should be sufficiently rigid to provide a rigid backbone support for the polymeric biphenyl compound.

Suitable rigid subunits have a backbone including one or more cycloalkyl, alkenyl, alkynyl, aryl, aralkyl, or heterocyclic groups or combinations thereof. Specific examples include acetylene, phenylene, thiophene, adamantane, cubane, or rigid subunits with the following structures:

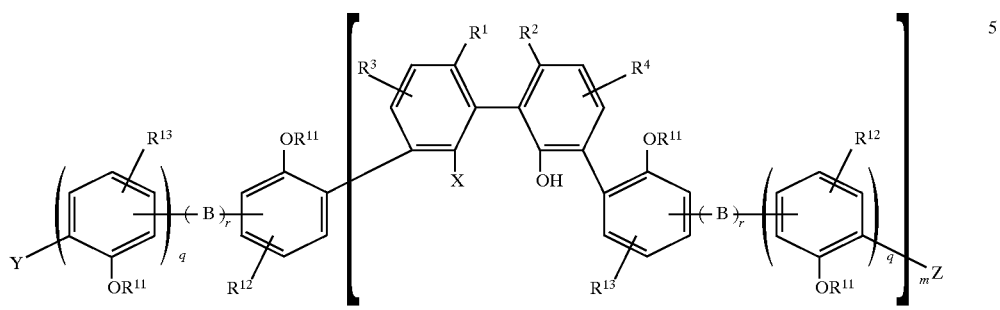

5 where q is 0 or 1, r is 0 or 1, B is a rigid subunit (similar to the rigid subunit, A) which has a backbone including one or more cycloalkyl, alkenyl, alkynyl, aryl, aralkyl, or hetero-

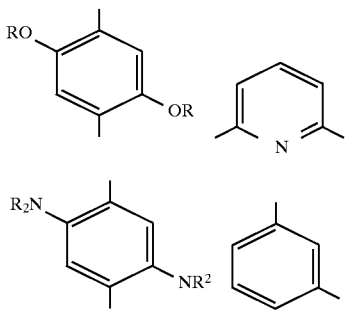

Suitable rigid subunits may also include a combination of the groups mentioned above, for example, biphenylene, triphenylene, and the structures illustrated below:

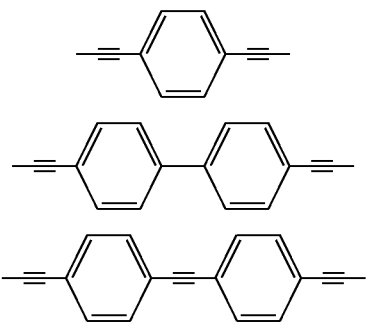

In addition, the backbone groups of the rigid subunits may have substituents such as halogen, alkoxy, —NRR', —CO$_2$R, —CONRR', or NO$_2$ where R and R' are independently alkyl, aryl, or aralkyl groups. Further examples of appropriate rigid subunits may be found in Hu, et al., *Macromolecules*, 29, 1082 (1996); Hu, et al., *Macromolecules*, 29, 5075 (1996); and Ma, et al., *Macromolecules*, 29, 5083 (1996), the disclosures of which are incorporated herein by reference.

Polymeric binaphthol (X=OH) compounds can be synthesized from 1,1'-bi-2-naphthol. For example, polybinaphthol 3 is a polymer with linkages at the 6 and 6' positions of the binaphthol subunit. This polymer is herein referred to as a 6,6'-linked polybinaphthol. Polybinaphthol 4 has linkages at the 3 and 3' positions and is referred to as a 3,3'-linked polybinaphthol. Other polybinaphthols may have symmetric linkage points at other positions such as 4 and 4'. Still other polymers may have asymmetric linkages such as, for example, at the 3 and 6' positions.

One method for making these polybinaphthols includes, first, halogenation of 1,1'-bi-2-naphthol at the sites at which the polymer is to be linked. To make polymer 3, the 6 and 6' sites of 1,1'-bi-2-naphthol are halogenated; to make polymer 4 the 3 and 3' sites are halogenated. Following halogenation, protecting groups are provided on any naphtholic hydroxyl groups. Suitable protecting groups include ethers, alkyls, esters, and crown ethers. Those skilled in the art are familiar with the use of protecting groups to protect hydroxyl moieties during reactions and they will therefore recognize that protecting groups other than those mentioned are suitable for this purpose.

For polymers without rigid subunits, A, the protected and halogenated binaphthol can then be polymerized in the presence of a nickel(0) or nickel(2) catalyst. Hu, et al., *J. Org. Chem.*, 61, 5200 (1996), incorporated herein by reference. Suitable nickel catalysts include NiCl$_2$ or (1,5-cyclooctadiene)$_2$Ni. A polymerization reaction catalyzed by NiCl$_2$ also typically requires the presence of excess zinc. The average molecular weight of the resulting polymer can be controlled to some extent by the amount of NiCl$_2$ catalyst used in the reaction. After polymerization, the hydroxyl protecting groups are then removed to give the polybinaphthol.

A polymer having rigid subunits, A, may be formed by a Suzuki coupling reaction (see Miyaura, et al., *Synth. Commun.*, 11, 513 (1981); Wallow, et al., *J. Am. Chem. Soc.*, 113, 7411 (1991); and Suzuki, *Acc. Chem. Res.*, 15, 179 (1982), the disclosures of which are herein incorporated by reference) between the halogenated and protected binaphthol and a spacer subunit which has boronic acid functional groups at the linkage sites. Alternatively, the polymer may be formed by, first, reacting the halogenated and protected polybinaphthol with magnesium followed by a trialkylborate and then hydrolysis to obtain a diboronic acid substituted binaphthol. Hu, et al., *Macromolecules*, 29, 1082 (1996) and Hu, et al., *Macromolecules*, 29, 5075 (1996), the disclosures of which are incorporated herein by reference. This compound is then Suzuki coupled with a spacer subunit which is halogenated at the linking positions to produce the polymer. The Suzuki coupling reaction in both instances takes place in the presence of a palladium catalyst and one or more phosphine ligands. Suitable phosphine ligands include triphenylphosphine and tritolylphosphine.

Monomer binaphthols may also be synthesized in this manner. In the case of a monomer, however, the rigid subunit, A, will typically have only functional group (e.g., diboronic acid or halogen group) that is capable of attachment to the protected binaphthol.

Polybinaphthols lacking a rigid subunit, A, can also be prepared by Suzuki coupling. This method includes the reaction of an approximately 1:1 mixture of halogenated binaphthol and diboronic acid substituted binaphthol to provide the polymer.

A different procedure can be used for adding rigid subunits with terminal alkynyl groups, i.e., rigid subunits having the following structure:

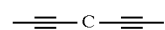

where C is the central portion of the rigid subunit and includes one or more suitable rigid subunit backbone groups such as cycloalkyl, alkenyl, alkynyl, aryl, or heterocyclic groups. In one method, the terminal alkyne subunit requires no substitution at the linkage sites. The alkyne subunit is reacted with a halogenated and hydroxyl-protected binaphthol in the presence of a palladium catalyst, phosphine ligands, and a copper compound, such as copper(I) halide or copper(II) acetate, to form a protected polybinaphthol. Ma, et al., *Macromolecules*, 29, 5083 (1996), incorporated herein by reference. This reaction is followed by removal of the hydroxyl protecting groups to give the desired polybinaphthol.

Alternatively, a halogenated and hydroxyl-protected binaphthol can be reacted with an alkyne in the presence of a palladium catalyst, phosphine ligands, and a copper compound, such as copper(I) halide or copper(II) acetate, to give a hydroxy-protected dialkynyl binaphthol. The protected polybinaphthol is then formed by a reaction of the hydroxy-protected dialkynyl binaphthol with a compound corresponding to the central portion of the spacer subunit, B, that has been halogenated at the linkage sites. This reaction is carried out in the presence of a palladium catalyst, phosphine ligands, and a copper compound, such as copper (I) halide or copper(II) acetate, and followed by removal of the hydroxyl protecting groups to give the desired polymer. Ma, et al., *Macromolecules,* 29, 5083 (1996).

Optically active polymers can be produced by starting with an optically active 1,1'-bi-2-naphthol. One method of resolving a 1,1'-bi-2-naphthol into optically active enantiomers involves a resolution procedure using (8S, 9R)-(–)-N-benzylcinchonidium chloride. Hu, et al., *Tetrahedron: Asymmetry,* 6, 2123 (1995), herein incorporated by reference. There is little enantiomeric conversion during the polymerization process described above so that relatively enantiomerically pure polymers can be obtained from pure optically active binaphthols.

If, instead, a mixture of different binaphthol enantiomers is used in the reaction then the enantiomers will be randomly distributed within the polymer. Optically active polymers may still be obtained from a starting material that is not enantiomerically pure, but there will be a consequent decrease in the optical activity of the polymer.

Other biphenyl compounds can be synthesized similarly by a proper choice of starting materials. For example, a polybinaphthyl with $X=OCH_3$ can be generated from starting material such as 2-hydroxy-2'-methoxy-1,1'-binaphthalene.

THE ORGANOZINC SPECIES

The organozinc species is formed as the reaction product of a polymeric biphenyl compound having formula 1 and an organozinc compound. The organozinc compound is typically $R^{14}R^{15}Zn$, where $R^{14}$ and $R^{15}$ are independently alkyl, alkenyl, alkynyl, aryl, aralkyl, or benzoyl. Alternatively, $R^{14}$ may be a trialkylsilyl- or triarylsilyl-substituted alkyl group. Preferably, $R^{14}$ and $R^{15}$ are C(1–8) alkyl.

One method of making the organozinc species is to dissolve the organozinc compound, $R^{14}R^{15}Zn$, and the biphenyl compound in a solvent. The reaction of the organozinc and biphenyl compound is typically conducted at a temperature between about –80° C. and about 50° C. and, preferably, between about 0° C. and 35° C.

The reacting step is typically carried out in an aprotic solvent which includes at least one of the following: a paraffin, a halogenated paraffin, benzene, a substituted benzene, or a saturated ether. The reacting step is preferably carried out in a solvent including at least one of the following: hexane, toluene, diethyl ether, tetrahydrofuran, dichloromethane, chloroform, or 1,2-dichloroethane.

The reaction is typically conducted under an anhydrous atmosphere and in the absence of oxygen. Preferably, the reaction is conducted under a relatively inert atmosphere such as nitrogen or argon.

The ratio of biphenyl compound to organozinc compound may vary over a wide range. Typically the ratio of 2,2'-substituted biphenyl subunits to organozinc compound is at least about 1:0.9. If hydroxy groups are present at both the 2 and 2' positions then the ratio of 2,2'-substituted biphenyl subunits is preferably at least about 1:1.8, and more preferably at least about 1:2.0. Often the organozinc compound is added in excess, especially if the organozinc compound is also a reagent in the reaction. Substoichiometric amounts of the organozinc compound may be used if, for example, the organozinc compound might generate unwanted reaction products with the other reagents.

The size of the biphenyl compounds (e.g., the number of 2,2'-substituted biphenyl subunits) may have an impact on the suitability of an organozinc species. Organozinc species which include polymeric biphenyl compounds, especially those with 5 or more subunits, may have significantly different catalytic properties than species which contain the monomeric biphenyl compound. However, polymeric biphenyl compounds with a small number of monomer subunits may have properties similar to those of the monomer.

As more subunits are added to the polymeric biphenyl compound, the solubility of the compound decreases. Typically, the polymeric biphenyl compounds have less than about 200 biphenyl subunits. Preferably, the polymeric biphenyl compounds have between about 5 and about 50 biphenyl subunits and more preferably, the polymeric biphenyl compounds have between about 10 and about 30 biphenyl subunits. Soluble monomers and polymers are useful in homogeneous catalysis reactions. Insoluble monomers and polymers, as well as soluble monomers and polymers, may be used for heterogeneous catalysis.

ALKYLATION OF AN ALDEHYDE

A wide variety of reactants may be used in the reaction of an organozinc compound with an aldehyde to form an alcohol. Almost any aldehyde may be used. Suitable aldehydes include alkyl, aryl, aralkyl, vinyl, or alkynyl aldehydes, such as butyraldehyde, benzaldehyde, phenylacetaldehyde, and trans-cinnamaldehyde.

Many different organozinc compounds may be used in the reaction. In general, the organozinc compound has the formula $R_2Zn$. Suitable R groups include alkyl, alkenyl, alkynyl, alkoxide, aryl, aralkyl, furyl, or benzoyl. Specific examples include methyl, ethyl, propyl, iso-propyl, n-butyl, ethylene, phenyl, furyl, benzyl, and phenylalkynyl. The R groups of the organozinc compound include substituents like ester, alkoxide, acetal, trialkylsilyl, triarylsilyl, or other similar groups which are less reactive than the aldehyde functionality. This organozinc compound may be the same as the organozinc compound used to make the catalytic organozinc species.

Typically, the organozinc species is formed prior to addition of aldehyde. However, in some embodiments, the organozinc species may be generated simultaneously with the aldehyde alkylation.

The alkylation reaction is typically conducted at a temperature between about –100° C. and about 100° C. and, preferably, between about –80° C. and about 50° C. If the reaction is conducted at a temperature that is too low, the reaction will proceed very slowly. If the temperature is too high there may be an increase in the amount of side reaction products. In addition, high reaction temperatures may result in lower enantiomeric excesses for those reactions where the desired product is optically active.

The reacting step is typically carried out in an aprotic solvent which includes at least one of the following: a paraffin, a halogenated paraffin, benzene, a substituted benzene, or a saturated ether. The reacting step is preferably carried out in a solvent including at least one of the following: hexane, heptane, toluene, diethyl ether, tetrahydrofuran, dichloromethane, chloroform, or 1,2-dichloroethane.

The reaction is typically conducted under an anhydrous atmosphere and in the absence of oxygen. Preferably, the reaction is conducted under a relatively inert atmosphere such as nitrogen or argon.

In the reaction, the typical equivalent ratio of 2,2'-substituted biphenyl subunits to aldehyde is about 1:200 to about 1:2. Preferably, the ratio of 2,2'-substituted biphenyl subunits to aldehyde is about 1:100 to about 1:5. Large amounts of catalyst are usually unnecessary to speed the reaction and instead only increase the cost. Insufficient catalyst may lead to an increase in the amount of side products.

REDUCTION OF A KETONE

Another reaction in which the organozinc species may act as a catalyst is the reduction of a ketone by a borane in the presence of an organozinc species of the invention to produce a secondary alcohol. A variety of ketones may be used in this reaction including both aliphatic and aromatic ketones. Typically, the organozinc species is formed prior to addition of ketone and borane. However, in some embodiments, the organozinc species may be generated simultaneously with the ketone reduction.

The borane reactant has the general formula, $BHR^{29}R^{30}$, where $R^{29}$ and $R^{30}$ are independently hydrogen, alkyl, alkoxy, aryl, or aralkyl. $R^{29}$ and $R^{30}$ may also form a ring with the boron atom. One example of a borane ring compound is catecholborane. The borane may also form a coordinative complex with one or more of the solvent atoms. Examples of such complexes include complexes of $BH_3$ with a thioether, such as $(CH_3)_2S$, or with tetrahydrofuran.

The reduction reaction is typically conducted at a temperature between about −80° C. and about 35° C. and, preferably, between about −50° C. and about 0° C. The reaction is typically carried out in an aprotic solvent which includes at least one of the following: a paraffin, a halogenated paraffin, benzene, a substituted benzene, or a saturated ether. The reacting step is preferably carried out in a solvent including at least one of the following: hexane, toluene, diethyl ether, dichloromethane, chloroform, or 1,2-dichloroethane.

The reaction is typically conducted under an anhydrous atmosphere and in the absence of oxygen. Preferably, the reaction is conducted under a relatively inert atmosphere such as nitrogen or argon.

In the reaction the typical equivalent ratio of 2,2'-substituted biphenyl subunits to ketone is about 1:100 to about 1:2. Preferably, the ratio of 2,2'-substituted biphenyl subunits to ketone is about 1:10 to about 1:2. The equivalent ratio of ketone to borane is typically about 1:0.9 to about 1:1.5 and preferably about 1:1 to about 1:1.2.

EPOXIDATION OF AN α,β-UNSATURATED COMPOUNDS

A further reaction which uses the organozinc species is the epoxidation of an α,β-unsaturated compound having the following formula:

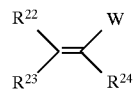

where W is —CN, —$NO_2$, —C(O)H, —C(O)$R^{25}$, —C(O)O$R^{26}$, or —C(O)N$R^{27}R^{28}$ and $R^{22}$, $R^{23}$, $R^{24}$, $R^{25}$, $R^{26}$, $R^{27}$, and $R^{28}$ are independently hydrogen, alkyl, aryl, aralkyl, trialkylsilyl, or triarylsilyl. The reaction also requires an oxidizing agent. Suitable oxidizing agents include $O_2$ and alkyl hydroperoxides (R—O—O—H), such as t-butyl hydroperoxide.

The epoxidation reaction is often performed after the formation of the organozinc species under an inert atmosphere, such as nitrogen. However, in some embodiments, the organozinc species may be formed simultaneously with the epoxidation reaction. The epoxidation reaction is typically conducted at a temperature between about −100° C. and about 60° C. and, preferably, between about −85° C. and about 50° C. The reaction is typically carried out in an aprotic solvent which includes at least one of the following: a paraffin, a halogenated paraffin, benzene, a substituted benzene, or a saturated ether. The reacting step is preferably carried out in a solvent including at least one of the following: hexane, toluene, diethyl ether, dichloromethane, chloroform, or 1,2-dichloroethane.

In the reaction, the typical equivalent ratio of 2,2'-substituted biphenyl subunits to α,β-unsaturated compound is about 2:1 to about 1:2 when oxygen is used as an oxidizing agent. When an alkyl hydroperoxide is used as the oxidizing agent, the equivalent ratio of 2,2'-substituted biphenyl subunits to ketone is about 1:1 to about 1:50. The equivalent ratio of oxidizing agent to α,β-unsaturated compound is typically about 1:1 or greater.

The following examples demonstrate the synthesis and uses of polymers of the invention. It is to be understood that these examples are merely illustrative and are in no way to be interpreted as limiting the scope of the invention.

EXAMPLES

In general, the binaphthols of the Examples are generated from 1,1'-bi-2-naphthol which is commercially available (Aldrich). This compound can be resolved into optically pure enantiomers by the technique of Hu, et al., *Tetrahedron: Asymmetry*, 6, 2123 (1995).

Halogenation of 1,1'-bi-2-naphthol can be accomplished by the techniques discussed in Pradellok, et al., *Chem. Abstr.*, 90, 121289t (1979) (bromination); Sogah, et al., *J. Am. Chem. Soc.*, 101, 3035 (1979) (bromination); and Cox, et al., *Tetrahedron Lett.*, 33, 2253 (1992) (iodation); all of which are incorporated herein by reference.

The addition of protecting groups, such as acetate and methoxymethyl, to the naphtholic hydroxyl groups is accomplished by methods well known to those skilled in the art.

The synthesis of the spacer subunit precursor with boronic acid groups at the linking sites is accomplished according to the method described in Huber, et al., *Macromol. Rapid Commun.*, 15, 897 (1994).

Example 1

Preparation of Polymer 4 with Binaphthol Subunits having an (R) Enantiomeric Configuration and X=OH ((R)-3,3'-linked Polybinaphthol with a p-dihexyloxybenzene Spacer)

To a mixture of methoxymethyl protected (R)-3,3'-diiodo-1,1'-bi-2-naphthol (7.32 g, 11.7 mmol), 2,4-di(boronic acid)-p-dihexyloxybenzene (4.3 g, 11.7 mmol), Ba(OH)$_2$.8H$_2$O (6.17 g, 36.0 mmol), Pd(OAc)$_2$ (0.134 g, 0.6 mmol), tris-o-tolylphosphine (0.365 g, 1.2 mmol) were added DMF (60 mL) and H$_2$O (10 mL). The whole mixture was refluxed for 42 h under nitrogen. EtOAc was then added and the organic layer was washed with H$_2$O and filtered. The filtrate was concentrated. The residue was redissolved in CH$_2$Cl$_2$ and precipitated from MeOH. This procedure was repeated three times. The precipitate was collected and dried under vacuum to give a methoxymethyl protected (R)-polymer of formula 4 as a yellow solid (7.0 g, 93%). $[\alpha]_D$=−63.39° (c=0.50, THF). $^1$H NMR(CDCl$_3$, 400 MHz) δ8.51 (s, low intensity), 7.93 (s, 2H), 7.86 (d, J=8.0 Hz, 2H), 7.77 (d, low intensity) 7.39 (m, 4H), 7.30 (m, 2H), 7.13 (br s, 2H), 7.0–7.5 (low intensity peaks were observed in this range due to the end groups), 4.54 (d, J=5.5 Hz, 2H), 4.50 (d, J=5.5 Hz, 2H), 3.95 (m, 4H), 2.44 (s, 6H), 1.65 (m, 4H), 1.25 (m, 4H), 1.17 (m, 8H), 0.74 (m, 6H). GPC (THF, polystyrene standards): Mw=5,900, Mn=3,900, PDI=1.53.

To a THF (30 mL) solution of the methoxymethyl protected (R)-polymer 4 (3.0 g) was added 6N HCl (20 mL). The mixture was heated to reflux for 16 h and then $CH_2Cl_2$ was added. The organic layer was washed with $H_2O$ and concentrated. The residue was redissolved in $CH_2Cl_2$ and precipitated from MeOH. This procedure was repeated three times. The precipitate was collected and dried in a vacuum to give (R)-polymer 4 (i.e., (R)-3,3'-linked polybinaphthol with a p-dihexyloxybenzene spacer) as a yellow solid (2.3 g, 88.8%). $[\alpha]_D$=+11.79° (c=0.50, THF). $^1$H NMR ($CDCl_3$, 400 MHz) δ8.49 (s, low intensity), 8.00 (s, 2H), 7.92 (d, J=8.0 Hz, 2H), 7.77 (d, low intensity), 7.34 (m, 6H), 7.24 (m, 2H), 6.32 (s, 2H), 6.15–7.4 (low intensity peaks were observed in this range due to the end groups) 4.01 (m, 4H), 1.66 (m, 4H), 1.26 (m, 4H), 1.13 (m, 8H), 0.73 (m, 6H). GPC (THF, polystyrene standards): Mw=6,700, Mn=4,600, PDI=1.46.

Example 2

Preparation of Polymer 3 with Binaphthol Units having an (R) Enantiomeric Configuration, no Spacer Subunit (i.e., n=0), and X=OH ((R)-6,6'-Linked Polybinaphthol)

Under nitrogen, to a mixture of acetate protected (R)-6, 6'-dibromo-1,1'-bi-2-naphthol (9.5 g, 18.0 mmol), zinc (4.0 g, 61.2 mmol), $NiCl_2$ (0.234 g, 1.80 mmol), $PPh_3$ (1.872 g, 7.2 mmol) and bipyridine (0.288 g, 1.8 mmol) was added DMF (60 mL). The mixture was stirred at 80°–90° C. for 24 h. It was then cooled to r.t. and diluted with $CH_2Cl_2$ (200 mL). After filtration, the solid was washed with $CH_2Cl_2$ (2×50 mL). The combined organic layer was washed with 1N HCl (50 mL) and brine (2×30 mL). The solution was concentrated and precipitated with MeOH. Centrifugation and filtration gave a solid which was redissolved in $CH_2Cl_2$ and precipitated with MeOH twice. The resulting solid was dried under vacuum at r.t. for 24 h to give acetate protected (R)-polymer 3 (with n=0) as a white powder (4.85 g, 73.2%). $[\alpha]_D$=−353.0° (c=0.5, THF). IR (KBr) $cm^{-1}$ 1765.0 (s), 1593.3 (m), 1500.7 (m), 1466.0 (m), 1429.3 (w), 1367.6 (s), 1331.0 (w), 1201.7 (s), 1082.1 (w), 1041.6 (w), 1012.7 (s), 884.4 (m), 821.7 (s). $^1$H NMR ($CDCl_3$, 400 MHz) δ1.89 (s, 6H, $CH_3$), 7.31 (m, 2H), 7.46 (m, H-2), 7.65 (br s, 2H), 8.06 (m, 2H, H-4), 8.21 (br s, 2H, H-5). $^{13}$C NMR ($CDCl_3$, 400 MHz) δ20.77, 122.6, 123.4, 126.3, 126.6, 127.0, 130.0, 131.96, 132.7, 137.9, 147.0, 169.6. Anal. Calcd for $C_{24}H_{16}O_4$: C, 78.25; H, 4.38. Found: C, 77.30; H, 4.47.

To a THF solution (150 mL) of acetate protected (R)-polymer 3 (with n=0)(4.30 g) was added a water solution (50 mL) of KOH (5.0 g). The mixture was heated at reflux for 24 h. The aqueous layer was separated and 1N HCl (100 mL) was added to acidify the water solution. A precipitate was generated which was collected by filtration. The solid was then redissolved in 0.5M KOH and precipitated with 1N HCl again. After washing with $H_2O$, the solid was dried under vacuum at r.t. for 24 h to give (R)-polymer 3 (with n=0) (i.e., (R)-6,6'-linked polybinaphthol) as a light yellow powder (2.80 g, 85%). $[\alpha]_D$=−139.8° C. (c=0.5, 0.5M aqueous KOH). IR (KBr) $cm^{-1}$ 3421.9 (s), 1593.3 (s), 1500.7 (s), 1466.0 (s), 1381.1 (s), 1336.8 (s), 1250.0 (m), 1215.2 (s), 1157.4 (s), 943.2 (w), 819.8 (s). $^1$H NMR (400 MHz, 0.5M NaOD.$D_2$O) δ7.09 (m, 2H), 7.15 (d, J=8.4 Hz, 2H), 7.46 (m, 2H), 7.81 (d, J=8.8 Hz, 2H), 8.12 (br s, 2H). UV (0.5M aqueous KOH) $\lambda_{max}$, 274, 340 nm. CD (0.5M aqueous KOH) $[\theta]_1$=2.45×10$^4$ (252 nm), −2.57×10$^4$ (276 nm), −1.30×10$^4$ (336 nm), 9.06×10$^3$ (364 nm) and 6.62×10$^3$ (377 nm).

Example 3

Preparation of Polymer 3 with Binaphthol Subunits having an (R) Enantiomeric Configuration, a p-dihexyloxybenzene Spacer Subunit, and X=OH. ((R)-6,6'-linked Polybinaphthol with a p-dihexyloxybenzene Spacer)

After a mixture of methoxymethyl protected (R)-6,6'-dibromo-1,1'-bi-2-naphthol (1.06 g, 2.0 mmol), 2,4-di (boronic acid)-p-dihexyloxybenzene (0.73 g, 2 mmol), $Pd(PPh_3)_4$ (116 mg, 0.10 mmol, 5 mol %) in THF (10 mL) and 1N $K_2CO_3$ (10 mL) was heated at reflux under nitrogen for 48 h, the organic layer was separated. $CH_2Cl_2$ (300 mL) was added to the organic layer, and the solution was washed with brine and dried over $Na_2SO_4$. Then the solvent was removed and the residue was redissolved in a minimum amount of $CH_2Cl_2$ and precipitated from MeOH. This process was repeated three times. The resulting precipitate was then dissolved in THF (10 mL) and 6N HCl (10 mL) was added. The solution was degassed with nitrogen and was heated at 80° C. for 12 h. $CH_2Cl_2$ (200 mL) was then added to extract the hydrolyzed polymer. The organic layer was washed with brine and dried over $Na_2SO_4$. After removal of the solvent, the residue was redissolved in a minimum amount of $CH_2Cl_2$ and precipitated from MeOH. This process was repeated three times to give (R)-polymer 3 (with a p-dihexyloxybenzene spacer) (i.e., (R)-6,6'-linked polybinaphthol with a p-dihexyloxybenzene spacer) as a pale white solid (yield 85%). GPC (THF, polystyrene standards): Mw=18,500 and Mn=9,000 (PDI=2.06). $[\alpha]_D$= −398.60° (c=1.00, $CH_2Cl_2$), $^1$H NMR ($CDCl_3$, 400 MHz) δ8.16 (s, 2H, short peak at 8.09), 8.01 (m, 2H), 7.64 (m, 2H, short peak at 7.57), 7.42 (m, 2H, short peak at 7.36), 7.27 (m, 2H), 7.10 (s, 2H, short peak at 7.01, 6.93), 3.96 (m, 6H, short peak at 3.90, 3.72, 3.57), 1.68 (m, 4H, short peak at 1.84, 1.76), 1.36 (m, 4H), 1.22 (m, 8H), 0.78 (s, 6H, short peak at 0.90).

Example 4

Reaction of Benzaldehyde with Diethylzinc in the Presence of the Polymer of Example 1 to give (R)-1-phenyl-1-propanol To a Schlenk flask containing toluene (10 mL) (dried with Na and degassed with $N_2$) was added the polymer of Example 1(28 mg, 0.05 mmol based on the biphenyl subunit) and diethylzinc (0.14 mL, 1.3 mmol) under $N_2$ at room temperature. After ca. 15 min, the flask was cooled to 0° C. and benzaldehyde (0.1 mL, 1 mmol) was added in a dropwise manner. Stirring was continued at this temperature for 10 h. The $^1$H NMR spectrum of the crude mixture showed 100% conversion with no side product. The reaction was then quenched with the addition of 1N HCl at 0° C. and the aqueous layer was extracted with diethyl ether. The combined organic layer was washed with brine until pH 7 and then dried over anhydrous $Na_2SO_4$. Concentration in vacuum gave a pale yellow oil, which upon treatment with MeOH (20 mL) precipitated the polymer. The filtrate was concentrated and purified by column chromatography on silica gel (eluent: EtOAc/hexanes 1/4) to afford (R)-1-phenyl-1propanol as a colorless liquid (122 mg, 89%). $^1$H NMR (270 MHz, $CDCl_3$) δ0.91 (t, J=7.4, 3H), 1.78 (dq, J=7.3, 6.4, 2H), 1.89 (br, 1H), 4.58 (t, J=6.5, 1H), 7.25–7.37 (m, 5H). [α]$_D$=42.91 (c=2.44, CHCl$_3$). The ee value was determined to be 92% on GC with a chiral column (α-Dex capillary column, Supelco Company). The recycled catalyst showed the similar reactivity and the same ee for the product.

Example 5

Reaction of Benzaldehyde with Diethylzinc in the Presence of the Polymer of Example 2 to give (R)-1-phenyl-1-propanol To a Schlenk flask containing degassed dry dichloromethane (10 mL) was added the polymer of Example 2 (28.6 mg, 0.1 mmol based on the biphenyl subunit) and diethylzinc (0.42 mL, 4 mmol). The resulting mixture was stirred at r.t. for 2.5 h. Benzaldehyde (0.2 mL, 2 mmol) was then added and the reaction mixture was stirred at r.t. for 112 h. Water (5 mL) and 1N HCl (5 mL) were added to quench the reaction. The polymer catalyst was filtered off and recovered. The organic layer in the filtrate was separated and the aqueous layer was extracted with dichloromethane. The combined organic phase was dried over Na$_2$SO$_4$ and concentrated under reduced pressure. $^1$H NMR spectroscopic analysis of this crude product indicated a complete conversion and the ratio of 1-phenyl-1-propanol to benzyl alcohol (a side product) was 53:47. Column chromatography on silica gel (eluent: EtOAc/hexanes=1/4) gave 1-phenyl-1-propanol as a colorless liquid (117 mg, 43%). GC analysis on a chiral column (β-Dex capillary column, Supelco Company) showed an ee of 13%.

Example 6

Reaction of Acetophenone with Diethylzinc in the Presence of the Polymer of Example 1 to give (R)-1-phenylethanol The polymer of Example 1 (32 mg, 0.055 mmol based on the biphenyl subunit) and diethylzinc (0.01 mL, 0.1 mmol) were added to a Schlenk flask containing 10 mL of toluene (dried with Na and degassed with N$_2$), under N$_2$ and at room temperature, to form the organozinc species. The resulting mixture was stirred at r.t. for 20 minutes. Acetophenone (0.12 mL, 1 mmol) was then added. The resulting mixture was cooled to −30° C. and 1.5 mL of catecholborane (1.5 mmol, 1M in THF) was added. Stirring was continued at this temperature for 38 h. The reaction was then quenched with 1N HCl and the aqueous layer was extracted with ether. The combined organic extracts were washed with brine until pH=7 and then dried over anhydrous Na$_2$SO$_4$. Concentration of the organic layer with a rotary evaporator gave a yellow oil, which upon addition of methanol, precipitated the polymer. The filtrate was concentrated and purified by column chromatography on silica gel with EtOAc/hexanes (1:5) to give (R)-1-phenylethanol as a colorless liquid (98 mg, 81%). GC analysis on a β-Dex capillary column (Supelco Company), with helium as the carrier gas, a flow rate of 1 mL/min, and an increase in oven temperature from 100° C. at a rate of 1° C./min, showed an ee of 67.0%.

Example 7

Preparation of (S)-6,6'-dibromo-2-hydroxy-2'-methoxy-1,1'-binaphthalene

To a suspension of 6,6'-dibromo-1,1'-bi-2-naphthol (7.75 g, 17.5 mmol) and K$_2$CO$_3$ (3.6 g, 26.3 mmol) in acetone was added CH$_3$I (1.2 mL, 24.2 mmol) at r.t. The mixture was stirred at r.t. for 32 h. The reaction was monitored by $^1$H NMR spectroscopy. When the dialkylated side product started to form, the reaction was quenched by pouring the mixture into water. After extraction with EtOAc (3×100 mL), the combined organic layers were washed with brine (3×20 mL) and dried over Na$_2$SO$_4$. The solvent was evaporated in vacuo and the crude product was purified by flash chromatography (silica gel, EtOAc/Hexane 20:1) to give (S)-6,6'-dibromo-2-hydroxy-2'-methoxy-1,1'-binaphthalene as a white crystalline solid (3.1 g, 40.0%, m.p. 92°–94° C.).

Example 8

Preparation of Polymer 3 with Binaphthol Subunits having an (S) Enantiomeric Configuration, a p-dihexyloxybenzene Spacer Subunit, and X═OCH$_3$. ((S)-6,6'-linked Methoxylated Polybinaphthol with a p-dihexyloxybenzene Spacer).

Under N$_2$, a mixture of 2-acetyloxy-2'-methoxy-6,6'-dibromo-1,1'-binaphthalene (0.50 g, 1.0 mmol, derived by the acylation of the product of Example 7), 2,4-di(boronic acid)-p-dihexyloxybenzene (0.50 g, 1.0 mmol), Pd(PPh$_3$)$_4$ (5 mol %) in THF (5 mL) and 1N K$_2$CO$_3$ (5 mL) was heated at reflux under nitrogen for 48 h. Then, KOH (0.56 g) was added and the mixture was heated at reflux under N$_2$ for another 12 h. The organic layer was separated and was combined with CH$_2$Cl$_2$ (500 mL). After washed with brine and dried over Na$_2$SO$_4$, the solvent was removed with roto-evaporation. The residue was redissolved in a minimum amount of CH$_2$Cl$_2$ and was precipitated with the addition of MeOH. This procedure was repeated three times to give polymer 3 with an (S) enantiomeric configuration, a p-dihexyloxybenzene spacer subunit, and X═OCH$_3$. ((S)-6,6'-linked, methoxylated polybinaphthol with a p-dihexyloxybenzene spacer). The product was a yellow solid with 75% yield.

Example 9

Preparation of (R)-3,3'-bis(2", 5"-dihexyloxyphenyl)-1,1'-bi-2 -naphthol

Under N$_2$ and at −78° C., n-BuLi (23.8 mL, 2.5M in hexanes) was added, over 30 min, to a solution of 1,4-dihexyloxy-2,5-dibromobenzene (25.92 g., 59.45 mmol) in THF (150 mL). After the addition, the reaction mixture was stirred at −78° C. for 1 h and was then quenched with aq. NH$_4$Cl at −78° C. After the usual workup, 1,4-dihexyloxy-2-bromobenzene was obtained as a pale yellow liquid (97% yield).

To a solution of 1,4-dihexyloxy-2-bromobenzene (10.71 g, 30 mmol) in THF (100 mL) was added n-BuLi (12 mL, 2.5M in hexanes) at −78° C. over 10 min. After the addition, the reaction mixture was stirred at −78° C. for 30 min and was than cannulated into a solution of triethylborate (3 e.g., 15 mL) in THF (80 mL) at −78° C. The mixture was stirred at −78° C. for 2 h and then at r.t. overnight. Hydrolysis of the resulting product solution with 2N HCl at r.t. for 2 h followed, after usual workup, by column chromatography on silica gel (hexanes/EtOAc=5/1) gave 1,4-dihexyloxy-2-(boronic acid) -benzene, a pure white solid (68% yield).

Under N$_2$, to a solution of (R)-2,2'-bis(methoxymethoxy) -3,3'-diiodo-1,1'-binaphthyl (2.63 g, 4.21 mmol) and 1,4-dihexyloxy-2-(boronic acid)-benzene (4.07 g, 12.63 mmol) in THF (50 mL) were added Pd[(PPh$_3$)]$_4$ (250 mg) and K$_2$CO$_3$ (aq. 2M, 20 mL, degassed with N$_2$) sequentially. The reaction mixture was heated at reflux for 22 h and then quenched with brine at r.t. After usual workup, column chromatography on silica gel (hexanes/EtOAc=10/1) gave (R)-2,2'-bis(methoxymethoxy)-3,3'-bis(2",5"-dihexyloxyphenyl)-1,1'-binaphthyl as a colorless oil (88% yield). $^1$H NMR (270 MHz, CDCl$_3$) δ7.88 (s, 2H), 7.83 (d. J=8.0 Hz, 2H), 7.33–7.41 (m, 4H), 7.24–7.29 (m, 2H), 7.03 (d, J=2.7 Hz, 2H), 6.88 (s, 2H), 6.86 (d, J=2.7 Hz, 2H), 4.46 (d, J=5.6 Hz, 2H), 4.41 (d, J=5.6 Hz, 2H), 3.94 (t, J=6.5 Hz, 4H), 3.89 (t, J=6.9 Hz, 4H), 2.35 (s, 6H), 1.77 (m, 4H), 1.64 (m, 4H), 1.45 (m, 4H), 1.16–1.35 (m, 20H), 0.89 (t, J=6.9 Hz, 6H), 0.77 (t, J=6.9 Hz, 6H).

To a solution of (R)-2,2'-bis(methoxymethoxy)-3,3'-bis(2",5"-dihexyloxyphenyl)-1,1'-binaphthyl (3.0 g) in a mixed solvent (10 mL CH$_2$Cl$_2$ and 30 mL EtOH) was added conc. HCl (5 mL). The reaction mixture was heated at reflux for 16 h. The volatile component was removed under reduced pressure and the residue was purified by column chromatography on silica gel (hexanes/EtOAc=10/1) to give (R)-3,3'-bis(2",5"-dihexyloxyphenyl)-1,1'-bi-2-naphthol as a colorless oil (85% yield). $^1$H NMR (270 MHz, CDCl$_3$) δ7.96 (s, 2H), 7.91 (d. J=8.0 Hz, 2H), 7.25–7.38 (m, 6H), 7.12 (d, J=2.5 Hz, 2H), 6.96 (s, 2H), 6.94 (d, J=2.7 Hz, 2H), 6.32 (s, 2H), 3.99 (t, J=6.5 Hz, 4H), 3.89 (t, J=6.7 Hz, 4H), 2.35 (s, 6H), 1.81 (m, 4H), 1.63 (m, 4H), 1.49 (m, 4H), 1.33–1.40 (m, 8H), 1.21–1.28 (m, 4H), 1.11–1.26 (m, 8H), 0.93 (t, J=6.9 Hz, 6H), 0.76 (t, J=6.9 Hz, 6H).

Example 10

Reaction of Acetophenone with Diethylzinc in the Presence of (R)-3,3'-bis(2",4"-dihexyloxyphenyl)-1,1'-bi-2-naphthol to give (S)-1-phenylethanol (R)-3,3'-bis(2",4"-dihexyloxyphenyl)-1,1'-bi-2naphthol (42 mg, 0.05 mmol) and diethylzinc (0.01 mL, 0.1 mmol) were added to a Schlenk flask containing 10 mL of toluene (dried with Na and degassed with N$_2$), under N$_2$ at room temperature, to form the organozinc species. The resulting mixture was stirred at r.t. for 20 minutes. Acetophenone (0.12 mL, 1 mmol) was then added. The resulting mixture was cooled to −30° C. and 1.5 mL of catecholborane (1.5 mmol, 1M in THF) was added. Stirring was continued at this temperature for 48 h. The reaction was then quenched with 1N HCl and the aqueous layer was extracted with ether. The combined organic extracts were washed with brine until pH=7 and then dried over anhydrous Na$_2$SO$_4$. Purification by column chromatography on silica gel with EtOAc/hexanes (1:5) gave (S)-1-phenylethanol as a colorless liquid (107 mg, 88%). GC analysis on a β-Dex capillary column (Supelco Company), with helium as the carrier gas, a flow rate of 1 mL/min, and an increase in oven temperature from 100° C. at a rate of 1° C./min, showed an ee of 81.3%. The retention time of the (R)-isomer was 20.02 min and the retention time of the (S)-isomer was 20.68 min. $^1$H NMR (270 MHz, CDCl$_3$): 1.49 (d, J=6.5, 3H), 1.79 (br, 1H), 4.90 (q, J=6.5, 1H), 7.25–7.40 (m, 5H).

Example 11

Epoxidation of α,β-unsaturated Ketones (RC(O)C=CR') by O$_2$ in the Presence of an Organozinc Species formed from a Biphenyl Compound The experimental procedure for the epoxidation of trans-chalcone (R=R'=Ph) is typical for these reactions. In a drybox, diethylzinc (38 μL, 0.38 mmol, 0.95 eq.) was added at room temperature and with stirring to a solution of the polymer of Example 3 (0.4 mmol) in 15 mL of dried dichloromethane in a 50 mL Schlenk flask to form the organozinc species. After 90 min, the reaction mixture was cooled to 0° C. and was placed under a balloon filled with O$_2$. After stirring for 2 hours, the reaction mixture was cooled to −78° C. and transchalcone chalcone (75 mg, 0.36 mmol, 0.90 eq.) was added. The reaction mixture was stirred for 30 min at this temperature and then rapidly warmed to 0° C. while stirring. The progress of the reaction was followed by thin layer chromatography (TLC). After 18 h, the reaction was quenched with saturated NH$_4$Cl (5 mL), 10% aqueous Na$_2$SO$_3$ (5 mL), and Et$_2$O (10 mL). The combined organic extracts were washed with saturated brine and dried over Na$_2$SO$_4$. The solvent was then removed under reduced pressure. After purification by flash chromatography on silica gel (hexane/EtOAc 15:1), the chiral epoxide was obtained in 41% yield. Its ee was 71% as determined on an HPLC-Chiracel OD column. The absolute configuration of the product was determined to be (S) at the α-position and (R) at the β-position by comparing the products optical rotation with the literature data.

Other α,β-unsaturated ketones were reacted under similar conditions. Table 1 presents the results for these reactions.

TABLE 1

Epoxidation of α,β-unsaturated Ketones (RC(O)C=CR') Using the Chiral Polybinaphthol of Example 3

| R | R' | Yield (%) | ee (%) | Solvent | Temp (°C.) | Ratio (Binaphthol/Et$_2$Zn/Ketone) |
|---|---|---|---|---|---|---|
| Ph | Ph | 34 | 37 | toluene | 0 | 1:0.95:0.90 |
| Ph | Ph | 41 | 71 | CH$_2$Cl$_2$ | 0 | 1:0.95:0.90 |
| Ph | Ph | 44 | 63 | CH$_2$Cl$_2$ | 0 | 1:1.9:0.90 |
| Ph | Ph | 64 | 49 | CH$_2$Cl$_2$ | −30 | 1:1.9:0.90 |
| Ph | Ph | 11 | 58 | CH$_2$Cl$_2$ | r.t. | 1:1.9:0.90 |
| Ph | p-MePh | 34 | 54 | CH$_2$Cl$_2$ | −15 | 1:1.9:0.90 |
| Ph | 2-naphthyl | 75 | 54 | CH$_2$Cl$_2$ | 0 | 1:1.9:0.90 |
| 2-naphthyl | Ph | 91 | 47 | CH$_2$Cl$_2$ | 0 | 1:1.9:0.90 |
| Ph | i-Pr | 18 | 25 | toluene | 0 | 1:0.95:0.90 |

Epoxidation of α,β-unsaturated ketones has also been catalyzed by the polybinaphthol of Example 8 in which one of the hydroxyl groups is methoxylated. Results are reported in Table 2.

TABLE 2

Epoxidation of α,β-unsaturated Ketones (RC(O)C=CR') Using a Mono-methoxylated Chiral Polybinaphthol of Example 8

| R | R' | Yield (%) | ee (%) | Solvent | Temp (°C.) | Ratio (Binaphthol/Et$_2$Zn/Ketone) |
|---|---|---|---|---|---|---|
| Ph | Ph | >90 | 35 | CH$_2$Cl$_2$ | 0 | 1:0.95:0.9 |
| Ph | Ph | >90 | 38 | CH$_2$Cl$_2$ | 0 | 1:0.95:0.9 |
| Ph | 2-naphthyl | 95 | 33 | CH$_2$Cl$_2$ | 0 | 1:0.95:0.9 |

A monomer catalyst derived from 2-hydroxy-2'-methoxy-6,6'-dibromo-1,1'-binaphthalene was also used to catalyze the epoxidation reaction. Results are reported in Table 3.

TABLE 3

Epoxidation of α,β-unsaturated Ketones (RC(O)C=CR') Using
2-hydroxy-2'-methoxy-6,6'-dibromo-1,1'-binaphthalene

| R | R' | Yield (%) | ee (%) | Solvent | Temp (°C.) | Ratio (Binaphthol/ $Et_2Zn$/Ketone) |
|---|---|---|---|---|---|---|
| 2-naphthyl | Ph | 70 | 44 | $CH_2Cl_2$ | 0 | 1:0.95:0.9 |
| 2-naphthyl | Ph | 65 | 37 | toluene | 0 | 1:0.95:0.9 |

In addition, 2-hydroxy-2'-methoxy-1,1'-binaphthalene was used as a catalyst. Results are reported in Table 4.

TABLE 4

Epoxidation of α,β-unsaturated Ketones (RC(O)C=CR') Using
2-hydroxy-2'-methoxy-1,1'-binaphthalene

| R | R' | Yield (%) | ee (%) | Solvent | Temp (°C.) | Ratio (Binaphthol/ $Et_2Zn$/Ketone) |
|---|---|---|---|---|---|---|
| Ph | i-Pr | 47 | 74 | toluene | 0 | 1.3:1.0:0.6 |

Example 12

Epoxidation of α,β-unsaturated Ketones (RC(O)C=CR') by t-butyl Hydroperoxide in the presence of an Organozinc Species Formed from a Biphenyl Compound In a drybox, diethylzinc (40 μL, 0.4 mmol.) was added at room temperature and with stirring to a solution of the polymer of Example 3 (112 mg, 0.2 mmol) and 4 Å molecular sieves (800 mg) in 10 mL of dried dichloromethane in a 50 mL Schlenk flask to form the organozinc species. After stirring for 30 min at room temperature, the reaction mixture was cooled to 0° C. and trans-chalcone (0.4 mmol) and a toluene solution of t-butyl hydroperoxide (1.5 mL, 5.8 mmol) were added. The reaction mixture was stirred at 0° C. for 5 h. The reaction was quenched with saturated $NH_4Cl$ solution. The solution was extracted with diethyl ether (3×15 ml) The combined organic extracts were dried over $Na_2SO_4$. The solvent was then removed under reduced pressure. After purification by flash chromatography on silica gel (hexane/EtOAc 20:1), the chiral epoxide was obtained in 96% yield. Its ee was 28.4% as determined on an HPLC-Chiracel OD column. The absolute configuration of the product was determined to be (S) at the α-position and (R) at the β-position from product's optical rotation, $[α]_D$= -63.63 (c=1.0, $CH_2Cl_2$).

The invention has been described with reference to various specific and preferred embodiments and techniques. However, it will be apparent to one of ordinarily skill in the art that many variations and modifications may be made while remaining within the spirit and scope of the invention.

All publications and patent applications in this specification are indicative of the level of ordinary skill in the art to which this invention pertains. All publications and patent applications are herein incorporated by reference to the same extent as if each individual publication or patent application was specifically and individually indicated by reference.

We claim:

1. A polymeric biphenyl compound having hindered 2,2'-substituted biphenyl subunits, the polymeric biphenyl compound having the formula:

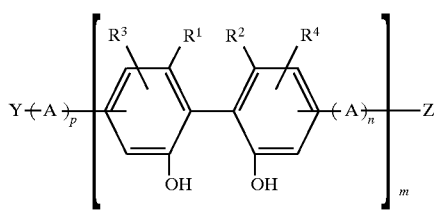

wherein n is 0 or 1,
p is 0 or 1,
A is a rigid subunit,
m is an integer greater than 3,
Y and Z are independently H, Cl, Br, I, or $B(OH)_2$,
$R^1$ and $R^2$ are hindering groups wherein $R^1$, $R^2$ or a combination thereof provides sufficient hindrance to internal rotation such that the 2,2'-substituted biphenyl subunits have an enantiomeric interconversion rate of no more than about 1% per hour at 100° C., and
$R^3$ and $R^4$ are independently hydrogen, alkyl, alkoxy, alkynyl, vinyl, —$CONR^5R^6$, —$CO_2R^7$, —$SO_2R^8$, —$NR^9R^{10}$, or halogen, wherein $R^5$, $R^6$, $R^7$, $R^8$, $R^9$ and $R^{10}$ are independently alkyl, aralkyl or aryl, or $R^1$ and $R^3$ form a substituted or unsubstituted first fused ring or $R^2$ and $R^4$ form a substituted or unsubstituted second fused ring.

2. A polymeric binaphthyl compound having 2,2'-substituted binaphthyl subunits, the polymeric binaphthyl compound having the formula:

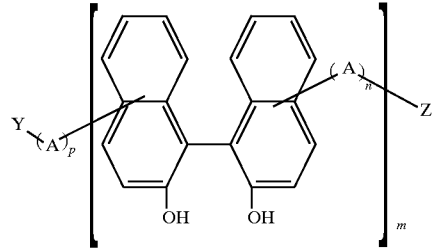

wherein n is 0 or 1,
is 0 or 1,
A is a rigid subunit,
m is an integer greater than 3, and
Y and Z are independently H, Cl, Br, I, or $B(OH)_2$.

3. The polymeric biphenyl compound of claim 1, wherein $R^1$ and $R^2$ are independently alkyl, alkoxy, phenyl, benzyl, —$CONR^5R^6$, —$CO_2R^7$, $SO_2R^8$, alkynyl, vinyl or $NR^9R^{10}$.

4. The polymeric biphenyl compound of claim 1, wherein at least about 75% of the biphenyl subunits have a same enantiomeric configuration.

5. The polymeric biphenyl compound of claim 4, wherein at least about 95% of the biphenyl subunits have the same enantiomeric configuration.

6. The polymeric biphenyl compound of claim 1, wherein the rigid spacer subunit has a backbone including one or more spacer groups selected from the group consisting of cycloalkyl, alkenyl, alkynyl, aryl and heterocyclic groups.

7. The polymeric biphenyl compound of claim 1, wherein the first fused ring is substituted with one or more substitutes selected from the group consisting of alkyl, alkoxy, phenyl, benzyl, —$CONR^5R^6$, —$CO_2R^7$, $SO_2R^8$, alkynyl, vinyl, nitro, halogen, and $NR^9R^{10}$, wherein $R^5$, $R^6$, $R^7$, $R^8$, $R^9$, and $R^{10}$ are independently alkyl, aralkyl or aryl.

8. The polymeric biphenyl compound of claim 1, wherein the second fused ring is substituted with one or more substitutes selected from the group consisting of alkyl, alkoxy, phenyl, benzyl, —CONR$^5$R$^6$, —CO$_2$R$^7$, SO$_2$R$^8$, alkynyl, vinyl, nitro, halogen, and NR$^9$R$^{10}$, wherein R$^5$, R$^6$, R$^7$, R$^8$, R$^9$, and R$^{10}$ are independently alkyl, aralkyl or aryl.

9. The polymeric biphenyl compound of claim 1, wherein m is about 4 to about 100.

10. The polymeric biphenyl compound of claim 1, wherein the rigid subunits are linked to the biphenyl subunits at 3 and 3' positions.

11. The polymeric biphenyl compound of claim 1, wherein p is 0 and n is 0.

12. The polymeric binaphthyl compound of claim 2, wherein the rigid spacer subunit has a backbone including one or more spacer groups selected from the group consisting of cycloalkyl, alkenyl, alkynyl, aryl or heterocyclic groups.

13. The polymeric binaphthyl compound of claim 2, wherein m is about 4 to about 100.

14. The polymeric binaphthyl compound of claim 2, wherein the rigid subunits are linked to the binaphthyl subunits at 3 and 3' positions.

15. The polymeric binaphthyl compound of claim 2, wherein the rigid subunits are linked to the binaphthyl subunits at 6 and 6' positions.

16. The polymeric binaphthyl compound of claim 2, wherein p is 0 and n is 0.

17. The polymeric binaphthyl compound of claim 2, wherein at least about 75% of the binaphthyl subunits have a same enantiomeric configuration.

18. The polymeric binaphthyl compound of claim 17, wherein at least about 95% of the binaphthyl subunits have the same enantiomeric configuration.

* * * * *

UNITED STATES PATENT AND TRADEMARK OFFICE
CERTIFICATE OF CORRECTION

PATENT NO. : 5,889,134
DATED : MARCH 30, 1999
INVENTOR(S) : PU ET AL.

It is certified that error appears in the above-identified patent and that said Letters Patent is hereby corrected as shown below:

Col. 17, line 3: "α−Dex" should be —β−Dex—

Signed and Sealed this

Twenty-second Day of February, 2000

Attest:

Q. TODD DICKINSON

Attesting Officer

Commissioner of Patents and Trademarks